United States Patent
Aida et al.

(10) Patent No.: US 11,211,838 B2
(45) Date of Patent: Dec. 28, 2021

(54) IPM ROTOR

(71) Applicant: Mitsubishi Electric Corporation, Tokyo (JP)

(72) Inventors: Hiroshi Aida, Tokyo (JP); Masafumi Okazaki, Tokyo (JP); Yuji Takizawa, Tokyo (JP); Satoru Akutsu, Tokyo (JP); Hideya Nishikawa, Tokyo (JP); Akihiko Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 71 days.

(21) Appl. No.: 16/496,502

(22) PCT Filed: Apr. 12, 2017

(86) PCT No.: PCT/JP2017/014929
§ 371 (c)(1),
(2) Date: Sep. 23, 2019

(87) PCT Pub. No.: WO2018/189822
PCT Pub. Date: Oct. 18, 2018

(65) Prior Publication Data
US 2020/0036244 A1 Jan. 30, 2020

(51) Int. Cl.
*H02K 21/12* (2006.01)
*H02K 1/27* (2006.01)

(52) U.S. Cl.
CPC ................... *H02K 1/2766* (2013.01)

(58) Field of Classification Search
CPC ............. H02K 1/2766; H02K 1/276
See application file for complete search history.

(56) References Cited

U.S. PATENT DOCUMENTS

| 7,843,101 | B2* | 11/2010 | Ito ........................ H02K 1/28 310/156.56 |
| 2014/0077652 | A1* | 3/2014 | Yamagishi ............ H02K 1/28 310/156.21 |

(Continued)

FOREIGN PATENT DOCUMENTS

| CN | 105830309 A | 8/2016 |
| DE | 102006011729 A1 | 9/2007 |

(Continued)

OTHER PUBLICATIONS

Communication dated Oct. 10, 2020, from the China National Intellectual Property Administration in Application No. 201780089261.7.

(Continued)

*Primary Examiner* — Yuriy Semenenko
(74) *Attorney, Agent, or Firm* — Sughrue Mion, PLLC; Richard C. Turner (57) ABSTRACT

According to the present invention, provided is an IPM rotor of the present invention, which includes a plurality of core sheets, having hole portions configured to accommodate magnets and being laminated on one another, and the magnets are inserted in the hole portions. The IPM rotor includes a first core sheet having a spring plate portion provided to the hole portion, and a second core sheet having a recessed portion provided the hole portion. A protruding portion is provided to the hole portion of at least one of the plurality of the laminated core sheets. The protruding portion is provided to at least one of the hole portion of the first core sheet, the hole portion of the second core sheet, or a hole portion of a third core sheet to be further arranged.

10 Claims, 7 Drawing Sheets

(56) References Cited

U.S. PATENT DOCUMENTS

| | | | |
|---|---|---|---|
| 2014/0191628 A1* | 7/2014 | Nakano | H02K 11/225 |
| | | | 310/68 B |
| 2014/0265718 A1* | 9/2014 | Komiya | H02K 1/28 |
| | | | 310/261.1 |
| 2015/0108866 A1* | 4/2015 | Kaiser | H02K 1/28 |
| | | | 310/156.08 |
| 2016/0285330 A1* | 9/2016 | Mukai | F04C 29/0085 |
| 2016/0294234 A1* | 10/2016 | Oh | H02K 15/03 |
| 2018/0309351 A1* | 10/2018 | Tachi | B29C 45/2708 |
| 2019/0103775 A1* | 4/2019 | Kashiwabara | H02K 1/26 |

FOREIGN PATENT DOCUMENTS

| | | | |
|---|---|---|---|
| JP | 2013051795 | * | 3/2013 |
| JP | 2015-076956 A | | 4/2015 |
| JP | 2016-046949 A | | 4/2016 |

OTHER PUBLICATIONS

Communication dated Feb. 27, 2020, from the European Patent Office in European Application No. 17905111.5.
International Search Report for PCT/JP2017/014929 dated Jun. 20, 2017 [PCT/ISA/210].
Communication dated Mar. 18, 2021, from the Indian Patent Office in Application No. 201947037355.

* cited by examiner

IPM ROTOR

CROSS REFERENCE TO RELATED APPLICATIONS

This application is a National Stage of International Application No. PCT/JP2017/014929 filed Apr. 12, 2017.

TECHNICAL FIELD

The present invention relates to an interior permanent magnet (IPM) rotor including laminated core sheets having permanent magnets embedded therein.

BACKGROUND ART

In a rotary electric machine, there are two types of rotors using permanent magnets, specifically, a surface permanent magnet (SPM) rotor and an IPM rotor. The SPM rotor have magnets pasted on a surface of a rotator. The IPM rotor have magnets embedded in a rotator. In the IPM rotor, magnets each having a rectangular parallelepiped shape can be used. Thus, the IPM rotor is more advantageous in terms of mounting and cost as compared to the SPM rotor. Further, generated torque is large, and hence reluctance torque can be used. Thus, employment of IPM rotors are being increased.

With regard to such IPM rotors, there has been known a method of laminating substantially circular core sheets, which have punched hole portions having the same shape as a cross section of the magnet, and then inserting magnet members in holes.

In the IPM rotor, it is required that magnetic flux generated from magnetic poles of the magnets be efficiently transmitted to coils of a stator. Magnetic flux which is not directed to the coils of the stator becomes wasted magnetic flux. Therefore, in the IPM rotor, it is required that attention be paid on a flow of the magnetic flux.

Further, in some cases, the IPM rotor may rotate at high speed, may suddenly rotate, or may suddenly stop. In addition, the magnets are physically fragile, that is, are liable to be chipped and cracked. Therefore, it is required that attention be paid on a method of fixing the magnets.

For example, in an IPM rotor described in Patent Literature 1, two types of core sheets are provided. The core sheets of one type have hole portions which are held in abutment against end surfaces of the magnets in a longitudinal direction. The core sheets of another type have hole portions defining a gap with respect to the end surfaces of the magnets in the longitudinal direction. Those two types of core sheets are laminated, and the magnets are fixed without an adhesive.

Further, in an IPM rotor described in Patent Literature 2, two types of hole portions are formed in a circumferential direction of one core sheet having a substantially circular shape. In one hole portion, a spring plate portion configured to press the magnet toward a radially outer side of the core sheet in the hole portion is provided. In another hole portion, a recessed portion serving as a relief portion for the spring plate portion is provided. Core sheets of one type each having those two types of hole portions together are laminated while being rotated.

CITATION LIST

Patent Literature

[PTL 1] JP 2016-46949 A
[PTL 2] JP 2015-76956 A

SUMMARY OF INVENTION

Technical Problem

However, in the IPM rotor described in Patent Literature 1, the magnet can be positioned in the longitudinal direction of the hole portion, but the magnet cannot be positioned in a width direction of the hole portion. Consequently, in the width direction of the hole portion, a gap is defined between the magnet and the core sheet. Thus, there is a fear in that magnetic flux density is decreased.

Further, in the IPM rotor described in Patent Literature 2, a spring plate portion or a recessed portion is separately provided in a hole portion of one core sheet. However, for example, a hole portion of an uppermost core sheet having the recessed portion does not have a core sheet thereon, and hence a spring plate portion is not arranged thereon. Such a recessed portion is not filled by a spring plate portion. Thus, in a width direction of the hole portion, a gap is defined between the magnet and the core sheet. As a result, there is a fear in that the magnetic flux density is decreased.

The present invention has been made to solve the above-mentioned problems, and provides an IPM rotor which is capable of suppressing a decrease in magnetic flux density and holding magnets with a simple structure.

Solution to Problem

According to one embodiment of the present invention, there is provided an IPM rotor, which includes a plurality of core sheets having hole portions configured to accommodate magnets and being laminated on one another, the magnets being inserted in the hole portions, the IPM rotor including: a first core sheet having a spring plate portion provided to the hole portion; and a second core sheet having a recessed portion provided to the hole portion, wherein at least one of the plurality of laminated core sheets has a protruding portion provided to the hole portion.

Advantageous Effects of Invention

According to the IPM rotor of the present invention, movement of the magnet in the longitudinal direction in the hole portion is regulated by the protruding portion. Further, the magnet is fixed in the width direction of the hole portion by the spring plate portion. The recessed portion is provided in the bending direction of the spring plate portion. Thus, the recessed portion is filled by the spring plate portion, and hence a gap is not defined. Further, the spring plate portion is provided at a position which does not cause a decrease in magnetic flux density.

With this, an IPM rotor which is capable of suppressing a decrease in magnetic flux density and holding magnets with a simple structure can be provided.

DESCRIPTION OF EMBODIMENTS

Referring to the accompanying drawings, an IPM ROTOR according to an exemplary embodiment of the present invention is described below. Note that, in each of the drawings, the same or corresponding portions are denoted by the same reference symbols, and the overlapping description thereof is omitted.

First Embodiment

Figure 1:
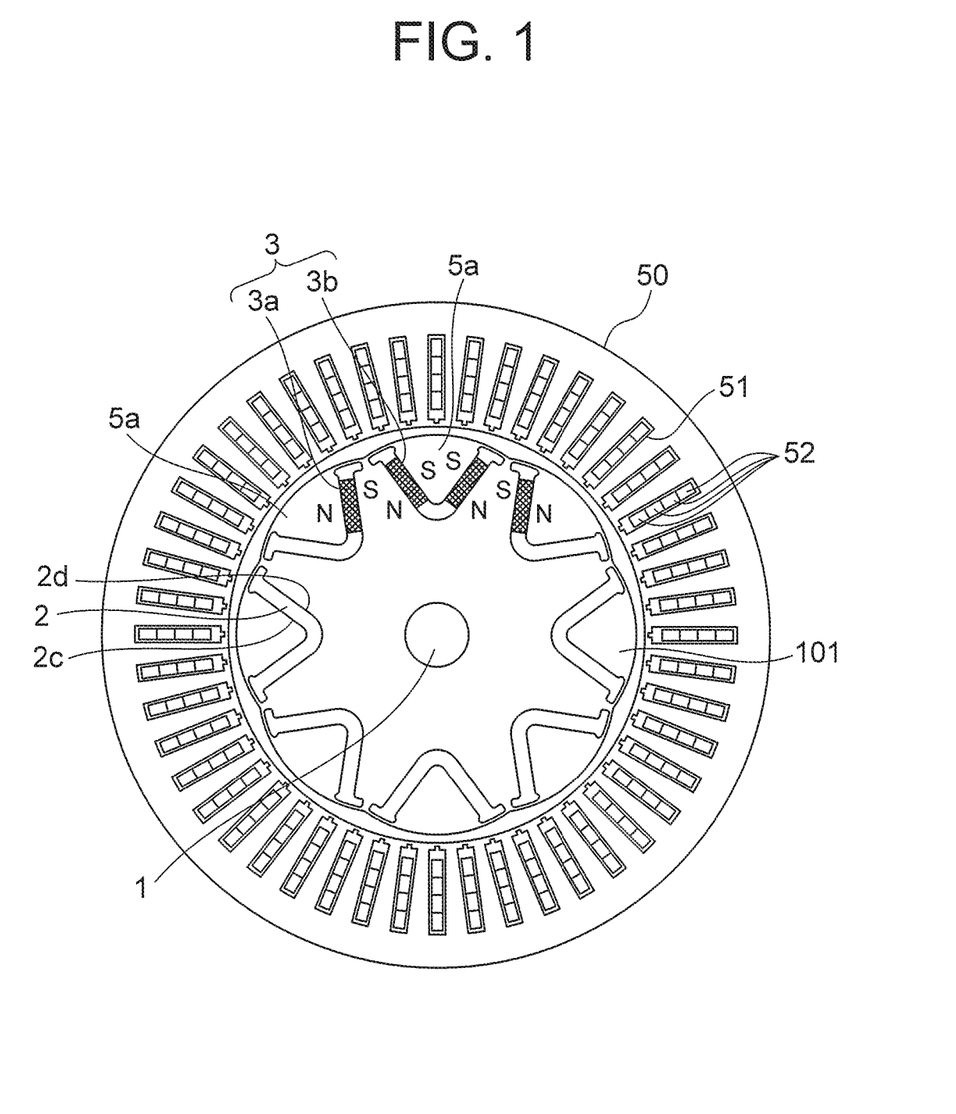
FIG. 1 is a sectional view for illustrating a motor including an IPM rotor according to a first embodiment of the present invention.

FIG. 1 is a sectional view for illustrating a motor including an IPM rotor according to a first embodiment of the present invention as seen from a direction of a rotary shaft of the motor. As illustrated in FIG. 1, an IPM rotor 101 is provided around a rotary shaft 1 as a center axis.

The IPM rotor 101 has eight hole portions 2 each having a V-shape. The hole portion 2 each have outward surfaces 2c on a radially outer side of the IPM rotor and inward surfaces 2d on a radially inner side of the IPM rotor 101. One magnet 3 having a substantially rectangular parallelepiped shape is arranged on both sides of the V-shape of the hole portion 2. The magnets 3 are classified into two cases depending on a direction of a flow of magnetic flux. In one case, a magnet 3a is arranged such that a first core portion 5a as a space defined between both sides of the V-shape is set to be an N-pole. In another case, a magnet 3b is arranged such that a first core portion 5a adjacent to the first core portion 5a serving as the N-pole is set to be an S-pole.

A stator 50 is provided on an outer periphery of the IPM rotor 101 to be concentric with the IPM rotor 101. Forty eight slots 51 are formed in the stator 50 along a circumferential direction. Four coils 52 are provided in one slot 51 in a radial direction.

Magnetic flux from the magnet 3 is generated from the magnet 3a, reaches the stator 50 through the first core portion 5a, and returns to the magnet 3b through another first core portion 5a. Meanwhile, magnetic fields are generated when a current is supplied to the coils 52 of the stator. Magnetic poles of the coils 52 attract or repel the magnets 3 so that the IPM rotor 101 is rotated. When a direction of the current flowing through the coils 52 is changed, a rotation direction of the IPM rotor 101 can be changed.

In the IPM rotor 101, core sheets each having a substantially circular-shape, which are made of electromagnetic steel plates, are laminated on one another, and the magnets 3 are inserted therein.

The core sheets forming the IPM rotor 101 are described with reference to FIG. 2 to FIG. 5. In each drawing of FIG. 2 to FIG. 5, there is given an enlarged illustration of only a portion of the core sheet.

Figure 2:
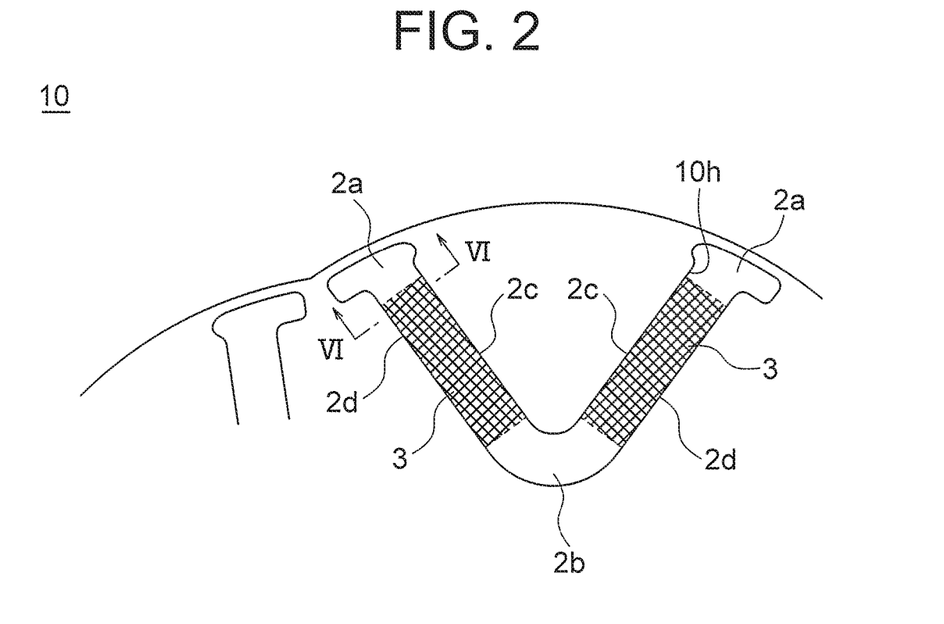
FIG. 2 is a partial plan view for illustrating a base core sheet in the first embodiment.

FIG. 2 is a partial plan view for illustrating a base core sheet 10. The basic core sheet 10 has a hole portion 10h. FIG. 2 is a view for illustrating a state in which the magnets 3 are inserted in the hole portion 10h. The hole portion 10h has a V-shape which is open toward a radially outer side of the basic core sheet 10. The hole portion 10h has spaces, which are longer than the magnets 3 in a longitudinal direction of the magnets 3 to be inserted, and hence there is freedom of movement of the magnets 3. Meanwhile, movement of the the magnets 3 in a width direction in the hole portion 10h is restrained.

Distal end portions 2a of the V-shape and a bent portion 2b of the V-shape of the hole portion 10h each have a widened hollow space. The hollow spaces of the distal end portions 2a and the bent portion 2b are called "flux barrier holes", and are configured to suppress direct flows of the magnetic flux from adjacent magnets 3.

Figure 3:
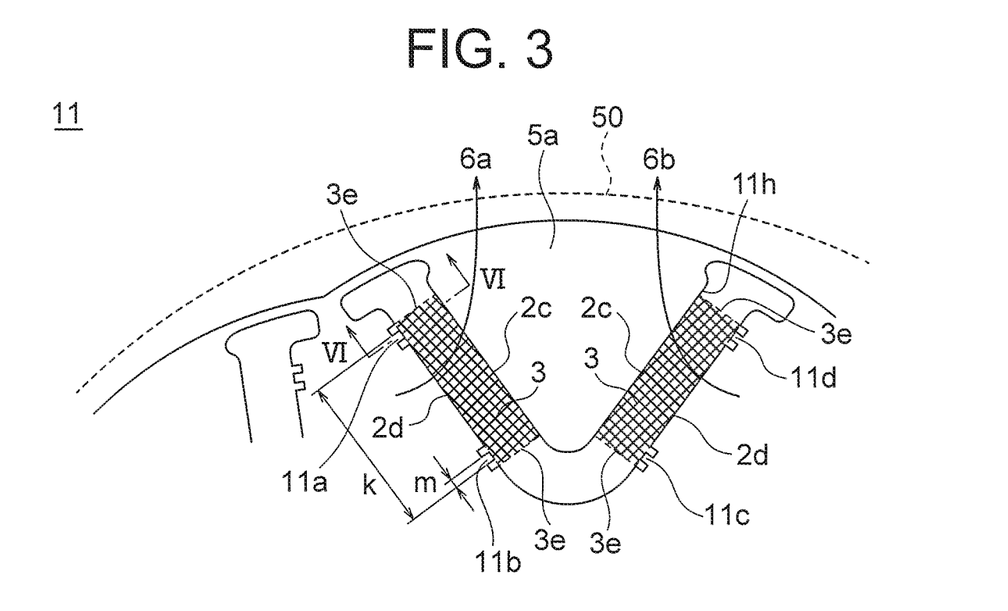
FIG. 3 is a partial plan view for illustrating a first core sheet in the first embodiment.
Figure 4:
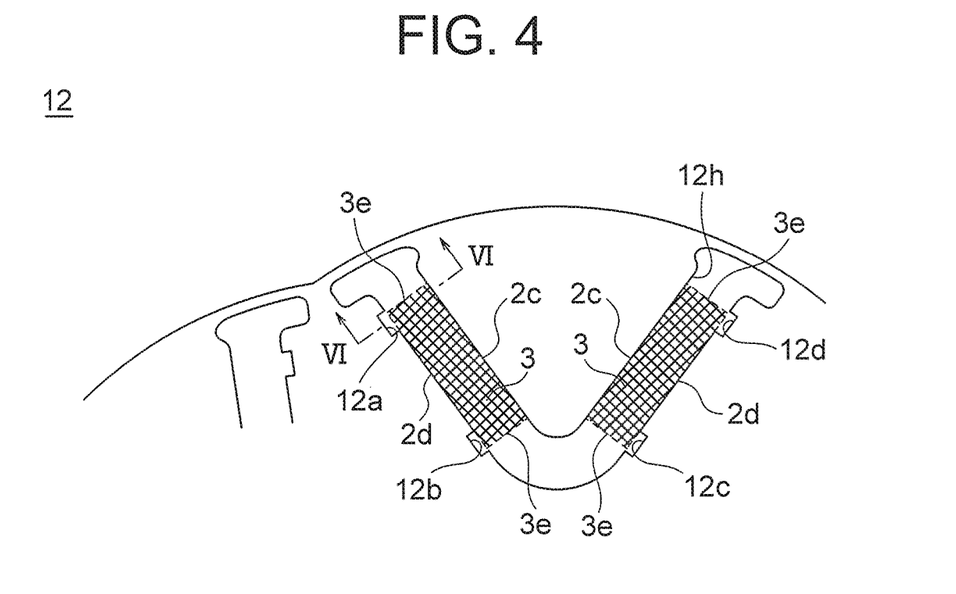
FIG. 4 is a partial plan view for illustrating a second core sheet in the first embodiment.
Figure 5:
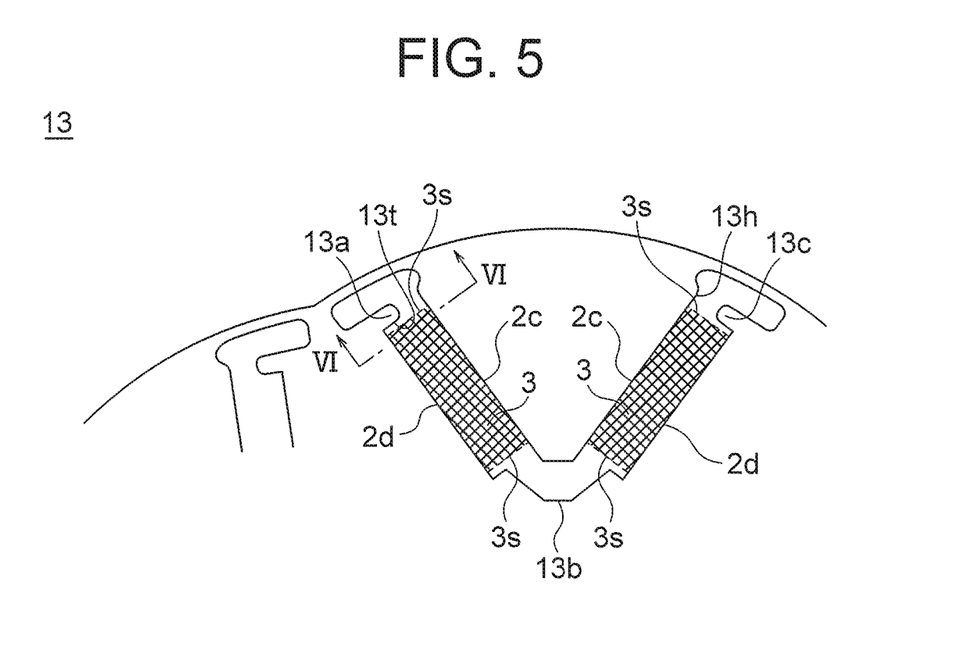
FIG. 5 is a partial plan view for illustrating a third core sheet in the first embodiment.

A first core sheet 11, a second core sheet 12, and a third core sheet 13, which are described in FIG. 3 to FIG. 5, are formed based on the base core sheet 10.

FIG. 3 is a partial plan view for illustrating the first core sheet 11. The first core sheet 11 has a hole portion 11h having a V-shape. FIG. 3 is a view for illustrating a state in which the magnets 3 are inserted in the hole portion 11h. Four spring plate portions 11a, 11b, 11c, and 11d are provided on the inward surfaces 2d of the hole portion 11h. The spring plate portions 11a and 11d are provided in a vicinity of the distal end portions of the V-shape in the hole portion 11h. Meanwhile, the spring plate portions 11b and 11c are provided in a vicinity of an intersection side of the V-shape in the hole portion 11h. That is, the four spring plate portions 11a to 11d are arranged at end portions 3e of long sides of the magnets 3. The four spring plate portions 11a to 11d each have such a shape formed in the following manner. A recess having a rectangular shape is formed so as to extend from the inward surface 2d of the hole portion 11h toward an outer side of the hole portion 11h, and a rectangular parallelepiped portion protrudes from a central portion of the recess toward an inner side of the hole portion 11h.

Here, a flow of magnetic flux 6a and 6b is described. The flow of magnetic flux 6a and 6b penetrates through a short-side direction of the magnets 3, passes through the first core portion 5a, and flows to the stator 50 on an outer side indicated by a broken line. It was found that, while an amount of the magnetic flux passing through central portions of the magnets 3 is greater than that of the magnetic flux passing through the end portions, a significant loss of the magnetic flux does not occur even when the four spring plate portions 11a to 11d are provided at the end portions of the magnets 3. Meanwhile, when the four spring plate portions 11a to 11d are provided on a side of the outward surfaces 2c of the hole portion 11h, or when the four spring plate portions 11a to 11d are respectively provided on different sides, the flow of the magnetic flux is obstructed. Accordingly, positions at which the four spring plate portions 11a to 11d are arranged are critical.

FIG. 4 is a partial plan view for illustrating the second core sheet 12. The second core sheet 12 has a hole portion 12h having a V-shape. FIG. 4 is a view for illustrating a state in which the magnets 3 are inserted in the hole portion 12h. The inward surfaces 2d of the hole portion 12h has four recessed portions 12a to 12d. The four recessed portions 12a to 12d are provided so as to correspond to the positions at which the four spring plate portions 11a to 11d of the first core sheet 11 described with reference to FIG. 3 are provided. The hole portion 12h is extended in a rectangular shape toward an inner side of the second core sheet 12 by a thickness of the first core sheet 11 to form the four recessed portions 12a to 12d. The four recessed portions 12a to 12d respectively serve as relief portions for the four spring plate portions 11a to 11d to be bent. Note that, in the hole portion 12h, portions other than the four recessed portions 12a to 12d are provided to have gaps with respect to the magnets 3 as small as possible. Therefore, influence of the shape of the hole portion 12h on the flow of magnetic flux 6a and 6b is small.

FIG. 5 is a partial plan view for illustrating the third core sheet 13. The third core sheet 13 has a hole portion 13h having a V-shape. FIG. 5 is a view for illustrating a state in which the magnets 3 are inserted in the hole portion 13h. The hole portion 13h has protruding portions 13a, 13b, and 13c on outer sides of the short sides 3s of the magnets 3 so as to reduce a width of the hole portion 13h. The three protruding portions 13a to 13c restrain the movement of the magnets 3 in the longitudinal direction in the hole portion 13h.

Next, a laminated structure of the core sheets for the IPM rotor 101 according to the first embodiment is described with reference to FIG. 6.

Figure 6:
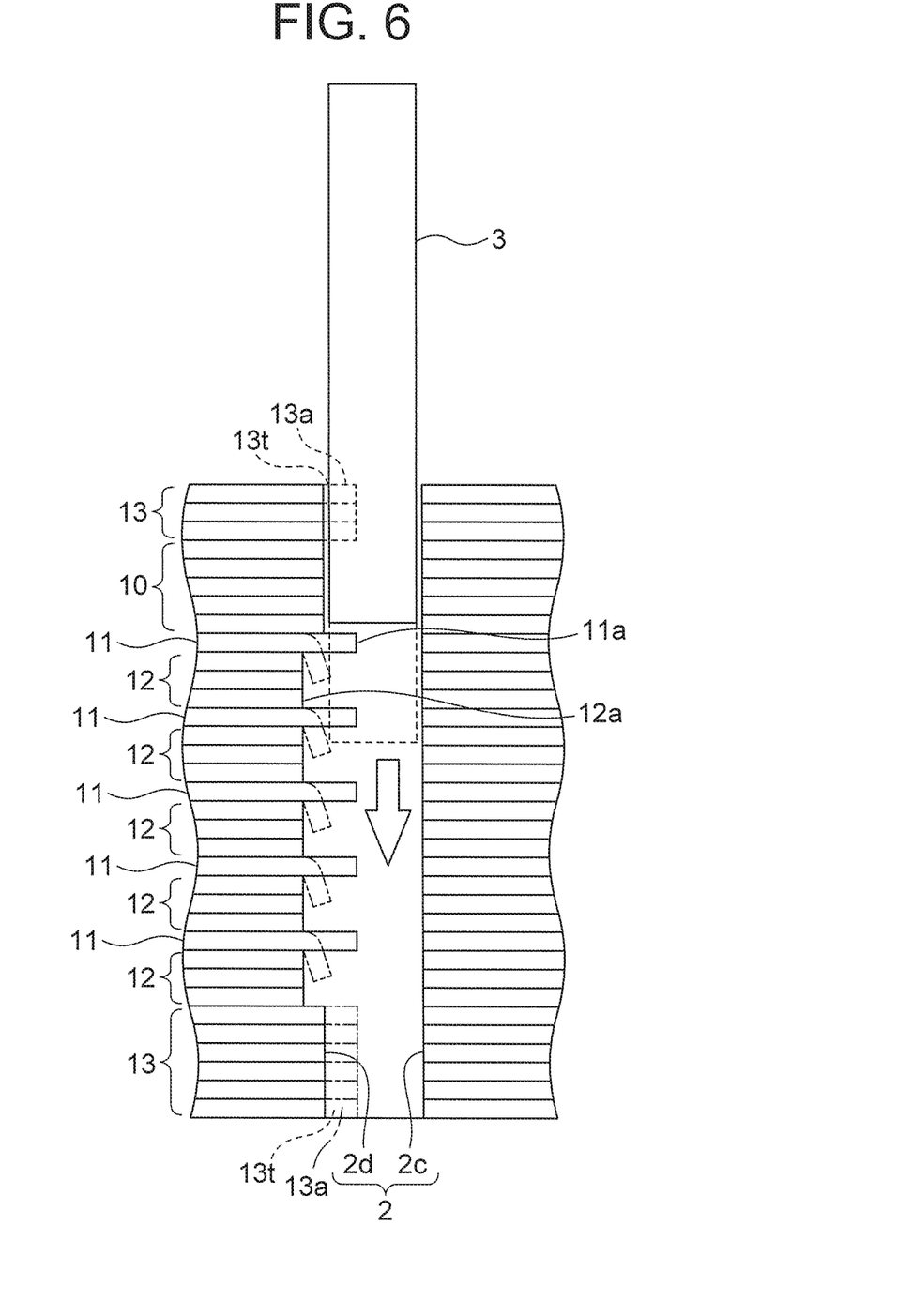
FIG. 6 is a sectional view of the core sheets, which are illustrated in FIG. 2 to FIG. 5, laminated on one another as seen from the line VI-VI of FIG. 2 to FIG. 5.

FIG. 6 is a sectional view for illustrating a periphery of the hole portion 2 in the IPM rotor 101. The sectional view illustrated in FIG. 6 is a view as seen from the line VI-VI of FIG. 2 to FIG. 5.

In the IPM rotor 101, there are provided base core sheets 10, first core sheets 11, second core sheets 12, and third core sheets 13, which are laminated in an order to be described later. The hole portions 10h, 11h, 12h, and 13h formed in the respective core sheets communicate to each other through lamination of the core sheets, to thereby form the hole portion 2. The magnet 3 is inserted in the hole portion 2. The hole portion 2 has the outward surfaces 2c and the inward surfaces 2d.

In the IPM rotor 101, the core sheets are laminated in the following order from an upper side from which the magnet 3 is inserted.

First, three third core sheets 13 are laminated. At the back of the magnet 3, protruding portions 13a are indicated by broken lines. The surfaces illustrated are magnet-side end surfaces 13t of the protruding portions 13a of FIG. 5.

Next, five base core sheets 10 are laminated.

Next, five sets including one first core sheet 11 and three second core sheets 12 are laminated.

Finally, six third core sheets 13 are laminated. A rotor length, that is, a height of the IPM rotor 101 is adjusted based on the number of the last third core sheets 13 to be laminated. In FIG. 6, the protruding portions 13a, which are located at the back of the magnet 3 when the magnet 3 is inserted, are indicated by chain lines. The surfaces illustrated are the magnet-side end surfaces 13t of the protruding portions 13a of FIG. 5. The base core sheets 10 may be used to adjust the rotor length.

Next, functions of respective core sheets in the laminated structure of the core sheets for the IPM rotor 101 are described with reference to FIG. 6 and FIG. 7. The description is given along an insertion process of the magnet 3.

As illustrated in FIG. 6, the magnet 3 is inserted from the upper side into the laminated structure of the core sheets for the IPM rotor 101. The magnet 3 is inserted in an unmagnetized state, and is magnetized after completion of the insertion.

First, the magnet 3 passes through a portion of the third core sheets 13. The protruding portions 13a indicated by the broken lines restrain movement of the magnet 3 in the longitudinal direction in the hole portion 2, and position the magnet 3.

Then, the magnet 3 passes through a portion of the base core sheets 10. In the base core sheets 10, positional deviation of the magnet 3 does not occur.

Next, the magnet 3 is brought into abutment against the spring plate portion 11a of the first core sheet 11. As indicated by the broken lines, the spring plate portion 11a is pressed and bent downward by the magnet 3. The magnet 3 is pressed against the outward surface 2c by a restoring force of the spring plate portion 11a. Further, the pressed and bent spring plate portion 11a fills the recessed portion 12a to be a gap between the second core sheets 12 and the magnet 3. The magnet 3 presses and bends the spring plate portions 11 four more times.

Next, the magnet 3 passes through the third core sheets 13 and is stopped at a bottom surface. The protruding portions 13a indicated by the one-dot chain lines restrain the movement of the magnet 3 in the longitudinal direction in the hole portion 2. The movement of the magnet 3 in the longitudinal direction is restrained at both an upper portion and a bottom portion so that the movement is further restrained.

Figure 7:
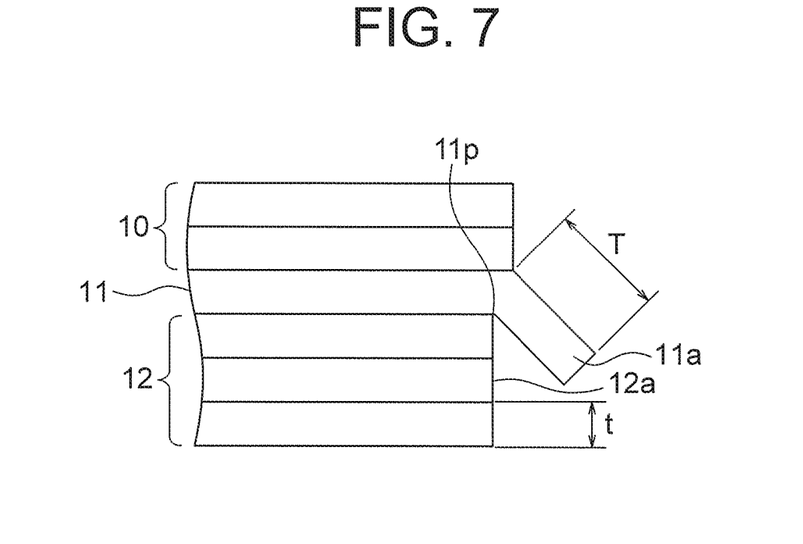
FIG. 7 is a schematic enlarged view for illustrating a periphery of a spring plate portion of FIG. 6.

FIG. 7 is a schematic enlarged view for illustrating a periphery of the spring plate portion 11a of FIG. 6. In FIG. 7, the spring plate portion 11a of the first core sheet 11 is illustrated in a state of being pressed and bent downward. The spring plate portion 11a is pressed and bent from a contact end portion 11p, as a starting point. The contact end portion 11p is a corner portion of the inward surface 2d at which the spring plate portion 11a of the first core sheet 11 is in contact with the recessed portion 12a of the second core sheets 12. It is required that the laminated second core sheets 12 have a thickness corresponding to, at least, a length T of the spring plate portion 11a. Consequently, the recessed portions 12a of the second core sheets 12 are filled by the bending of the spring plate portion 11a of the first core sheet 11 so that a gap is not formed. It is preferred that the length T of the spring plate portion 11a be $10t \geq T \geq t$, though depending on a thickness t of the second core sheet.

In the first embodiment, the length T of the spring plate portion 11a is about 2.6 times the thickness t of the second core sheet. Meanwhile, the relief of the spring plate portion 11a against pressing and bending is achieved by the laminated three second core sheets 12. That is, the thickness of the continuously laminated second core sheets 12 is $3t$. Therefore, the thickness $3t$ of the continuously laminated second core sheets 12 is equal to or more than the length T of the spring plate portion 11a. The same also applies to the lengths of the spring plate portions 11b, 11c, and 11d.

A width m of the spring plate portion 11a of the first core sheet 11 is described with reference to FIG. 3. The width m together with a thickness t' of the first core sheet 11a determine a force to press the magnet 3 against the outward surface 2c of the hole portion 2. When the pressing force is too strong, the magnet 3 is damaged. Further, the spring plate portion 11a is less likely to be deformed so that the magnet 3 is less likely to be easily inserted. Meanwhile, when the pressing force is too weak, the magnet 3 cannot be fixed. Therefore, it is preferred that the width m of the spring plate portion 11a be $10t' > m > t'$ with respect to the thickness t' of the first core sheet 11.

In the first embodiment, the width m of the spring plate portion 11a is set to be about six times the thickness t' of the first core sheet 11. The same applies to the widths of the spring plate portions 11b, 11c, and 11d.

Further, the widths m of the four spring plate portions 11a to 11d also relate to a size of the magnets 3. As illustrated in FIG. 3, it is preferred that a length k of the magnet 3 in the longitudinal direction of the hole portion 11h be 0.34k≥m with respect to the widths m of the four spring plate portions 11a to 11d.

In the first embodiment, the widths m of the four spring plate portions 11a to 11d are about 0.11 times the length k of the magnet 3, and satisfy the relational expression between k and m.

As described above, the size of the four spring plate portions 11a to 11d is defined by the thickness t' of the first core sheet 11 and the length k of the magnet 3, and hence it is possible to achieve both a suitable pressing force against the magnets 3 and ease of insertion of the magnets 3.

As described above, in the IPM rotor 101 according to the first embodiment, the plurality of core sheets 10 to 13 having the hole portions 2 configured to accommodate the magnets 3 laminated on one another, and the magnets 3 are inserted in the hole portions 2. The IPM rotor 101 includes: the first core sheets 11 each having the spring plate portion 11a to 11d provided to the hole portion 11h; and the second core sheets 12 each having the recessed portion 12a to 12d provided to the hole portion 12h. At least one of the plurality of the laminated core sheets 10 to 13 has the protruding portions 13a to 13c provided to the hole portion 2.

With this, an IPM rotor which is capable of suppressing a decrease in magnetic flux density and holding magnets with a simple structure can be provided.

The IPM rotor 101 includes the third core sheets 13, and the third core sheet 13 each have the three protruding portions 13a to 13c. With this structure, variations of the laminated structure of the core sheets can be increased, and hence a degree of freedom in design can be increased.

The IPM motor 101 further includes the base core sheets 10 only having the hole portion 10h. The IPM motor 101 includes portions at which three third core sheets 13, five base core sheets 10, the first core sheet, and three second core sheets are laminated in the stated order. With this structure, it is possible to achieve both fixation of positions of the magnets 3 and ease of insertion of the magnets 3.

The second core sheets 12 are successively laminated on the first core sheets 11. The spring plate portions 11a of the first core sheets 11 are bent from the contact end portions lip between the spring plate portions 11a of the first core sheets 11 and the recessed portions 12a of the second core sheets 12. The thickness of the second core sheets 12 laminated successively is equal to or more than the length T of the spring plate portion 11a. The length T of the spring plate portion 11a is three times, which falls within a range of from one time or more to ten times or less, the thickness t of the second core sheet 12. As a result, the recessed portions 12a of the second core sheets are filled by the spring plate portions 11a so that gaps are not formed, and a decrease in magnetic flux density does not occur.

The width m of the spring plate portion 11a is six times, which exists within a scope of one time to ten times of the thickness t' of the first core sheet 11. With this structure, it is possible to fix the magnets 3 without damaging the magnets 3, and to achieve ease of insertion of the magnets 3.

The magnets 3 each have a substantially rectangular parallelepiped shapes. The hole portions 2 are formed to have a V-shape which is open toward a radially outer side of the core sheet 10 to 13. The three protruding portions 13a to 13c are provided on an outer side of the short side 3s of the magnets 3. The four spring plate portions 11a to 11d serve as the inward surfaces 2d on the radially inner side of the hole portion 11h, and are provided at the end portions 3e of the long side of the magnets 3. With this structure, it is possible to fix positions of the magnets 3 without causing a significant loss of the flow of magnetic flux 6a and 6b.

In the first embodiment, four types of core sheets are used. However, the third core sheets 13 may be used in place of the base core sheets 10 to form the IPM rotor using three types of core sheets.

Further, the thickness t of the first core sheet 11 and the thickness t of the second core sheet 12 may be equal to each other.

Second Embodiment

Next, an IPM rotor 102 according to a second embodiment of the present invention is described with reference to FIG. 8 to FIG. 11. The second embodiment differs from the first embodiment in a shape of hole portions in which the the magnets are inserted.

Figure 8:
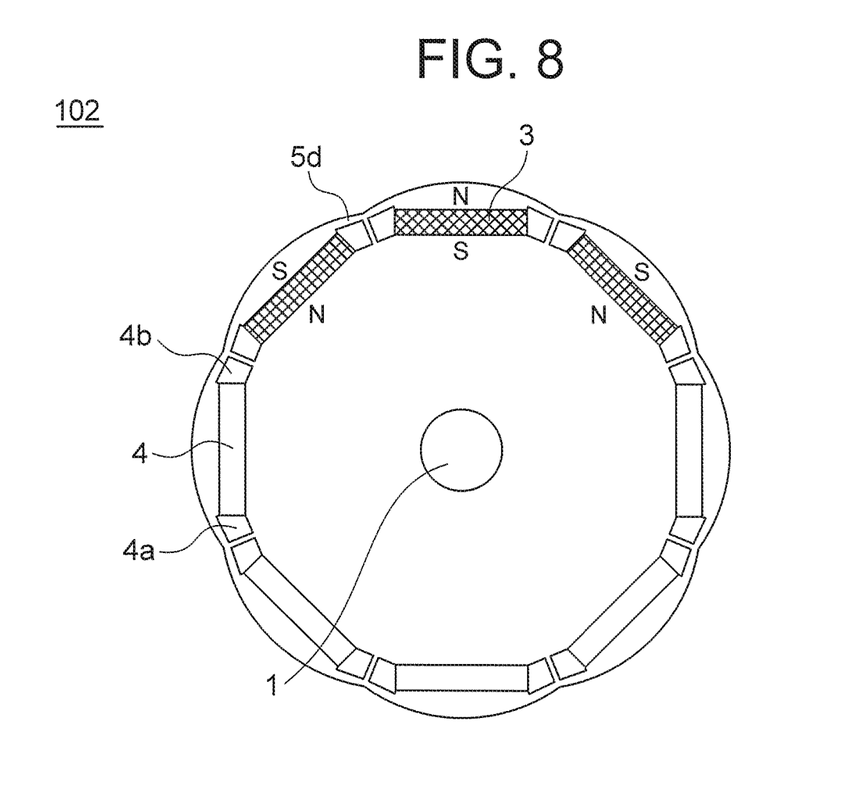
FIG. 8 is a sectional view for illustrating a motor including an IPM rotor according to a second embodiment of the present invention.

FIG. 8 is a schematic view for illustrating the IPM rotor 102 according to the second embodiment as seen from a direction of the rotary shaft 1. In the IPM rotor 102, eight hole portions 4 each having a linear shape are formed in an arc direction of the IPM rotor 102 having a substantially circular shape. Magnets 3 to be inserted in the hole portions 4 are arranged such that N-poles and S-poles are alternately arranged along an outer side of the IPM rotor 102. Both ends of each hole portion 4 in the longitudinal direction are widened to form gaps 4a and 4b. The gaps 4a and 4b are flux barrier holes, and intend to suppress a direct flow of the magnetic flux of the magnets 3 adjacent to each other. Further, bridge portions 5d are arranged on an outer side of the gaps 4a and 4b. The bridge portions 5d are formed thinner than other portions in an outer peripheral portion of the hole portion 4. The bridge portions 5d also intend to cause the magnetic flux from the adjacent magnets 3 less likely to flow directly.

The IPM rotor 102 includes three types of core sheets. The core sheets forming the IPM rotor 102 are described with reference to FIG. 9 to FIG. 11. In each drawing of FIG. 9 to FIG. 11, there is given an enlarged illustration of only a portion of a core sheet. Further, in each drawing of FIG. 9 to FIG. 11, there is Liven an illustration of a state in which the magnet 3 is inserted in each hole portion.

Figure 9:
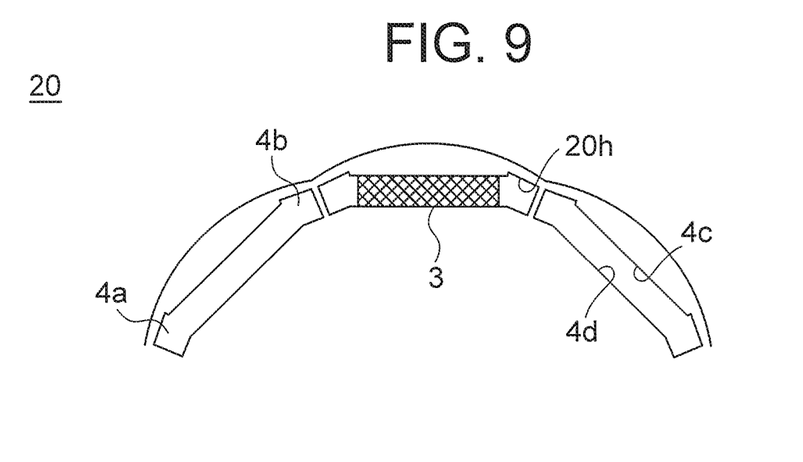
FIG. 9 is a partial plan view for illustrating a base core sheet in the second embodiment.

FIG. 9 is a partial plan view for illustrating a base core sheet 20. The base core sheet 20 has hole portions 20h in the arc direction. Each hole portion 20h has a gap, which is longer than the magnet 3 in a longitudinal direction of the hole portion 20h, and there is freedom of movement of the magnet 3. Meanwhile, the movement of the magnet 3 is restrained in a width direction of the hole portion 20h. Further, the hole portion 20h has an outward surface 4c on a radially outer side, and an inward surface 4d on a radially inner side, of the basic core sheet 20.

Figure 10:
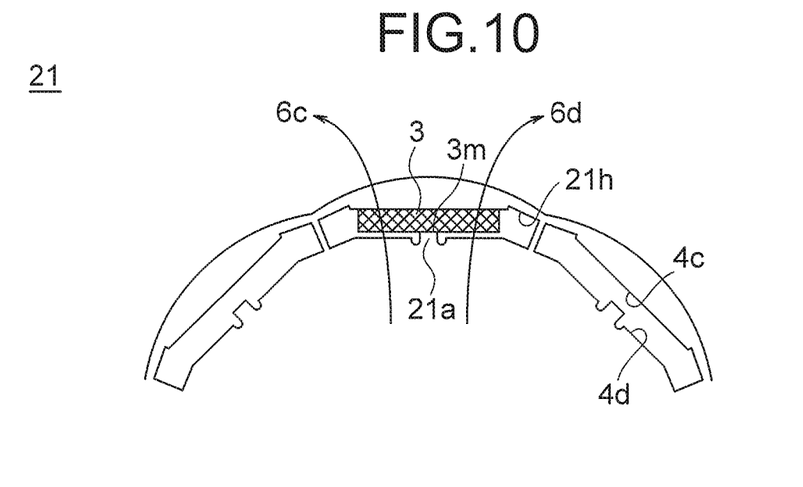
FIG. 10 is a partial plan view for illustrating a first core sheet in the second embodiment.
Figure 11:
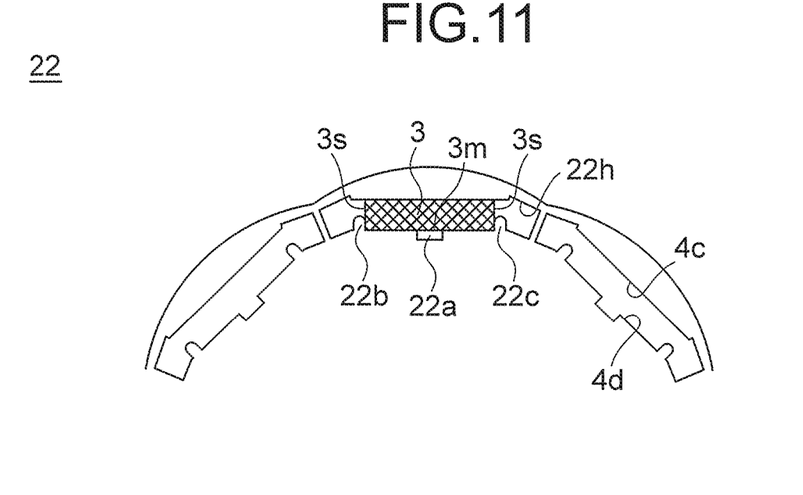
FIG. 11 is a partial plan view for illustrating a second core sheet in the second embodiment.

A first core sheet 21 and a second core sheet 22, which are described in FIG. 10 and FIG. 11, are formed based on the base core sheet 20.

FIG. 10 is a partial plan view for illustrating the first core sheet 21. The first core sheet 21 has hole portions 21h in the arc direction. A spring plate portion 21a is provided at a central portion 3m of a long side of the magnet 3 in the inward surface 4d of the hole portion 21h. The spring plate portion 21a has a recess having a rectangular shape from the inward surface 4d of the hole portion 21h toward an outer side of the hole portion 21h, and has a shape in which a rectangular parallelepiped portion protrudes from a central portion of the recess toward an inner side of the hole portion 21h. The spring plate portion 21a is pressed and bent by the magnet 3. The pressed and bent spring plate portion 21a acts to press the magnet 3 by a restoring force against the outward surface 4c of the hole portion 21h.

Here, a flow of magnetic flux 6c and 6d is described. The flow of magnetic flux 6c and 6d is generated substantially in parallel to a short side of the magnet 3, and flows to an outer side of the first core sheet 21 to expand in right and left directions. Therefore, even when the spring plate portion 21a is arranged at the central portion of the magnet 3, influence on the flow of magnetic flux 6c and 6d is small. The magnet 3 is brought into close contact with the outward surface 4c of the hole portion 21h so that there is no gap between the magnet 3 and the first core sheet 21, As a result, the flow of magnetic flux 6c and 6d is not restrained.

FIG. 11 is a partial plan view for illustrating the second core sheet 22. The second core sheet 22 has hole portions 22h in the arc direction. A recessed portion 22a is provided at the central portion 3m of the long side of the magnet 3 in the inward surface 4d of each hole portion 22h. The hole portion 22h is widened to have a rectangular shape in a direction toward a radially inner side of the second core sheet 22 by a thickness of the first core sheet 21 to form the recessed portion 22a. Further, the recessed portion 22a is positioned to correspond to the spring plate portion 21a of the first core sheet 21, and functions as a relief portion of the spring plate portion 21a.

Moreover, the hole portion 22h has protruding portions 22b and 22c, which protrude to an outer side of the short sides 3s of the magnets 3 so as to reduce a width of the hole portion 22h. The protruding portions 22b and 22c restrain the movement in the longitudinal direction of the magnets 3 in the hole portion 22h.

Those three types of core sheet in the IPM rotor 102 are laminated in the following order. That is, the second core sheets 22 are laminated on a lower side of the first core sheet 21. A thickness of the second core sheets 22 to be laminated is set to be equal to or more than a length of the spring plate portion 21a. Such a plurality of pairs of the first core sheets 21 and the second core sheets 22 are arranged, and the base core sheets 20 are arranged between those pairs, or the both upper and lower ends of the pairs.

In this manner, in the IPM rotor 102 in the second embodiment, the protruding portions 22b and 22c are arranged in the hole portions 22h of the second core sheet 22. As a result, the number of types of the core sheets to be prepared can be reduced, and reduction in cost can be achieved.

Further, the magnets 3 have a substantially rectangular parallelepiped shape. The hole portions 4 are arranged in the arc direction of the core sheets 20 to 22. The protruding portions 22b and 22c are arranged on the outer sides of the short sides of the magnets 3. The spring plate portions 21a are arranged at the central portions 3m of the long sides of the magnets 3 in the inward surfaces 4d on the radially inner side of the hole portions 21h. With this structure, the flow of magnetic flux 6c and 6d is not obstructed, and the magnets 3 can be fixed with a simple structure. As a result, it is possible to achieve a rotor of a rotary electric machine having a high efficiency.

Third Embodiment

Next, an IPM rotor according to a third embodiment of the present invention is described with reference to FIG. 12 and FIG. 13. In the third embodiment, protruding portions, which are configured to restrain movement in a longitudinal direction of a magnet, are arranged in a first core sheet having a spring plate portion.

Figure 12:
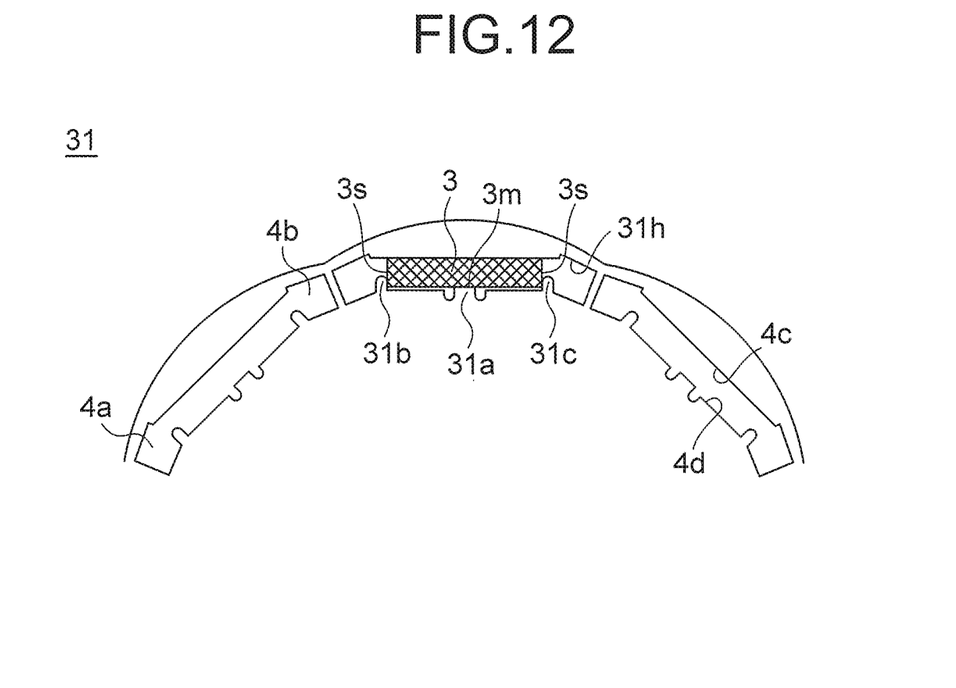
FIG. 12 is a partial plan view for illustrating a first core sheet in a third embodiment of the present invention.
Figure 13:
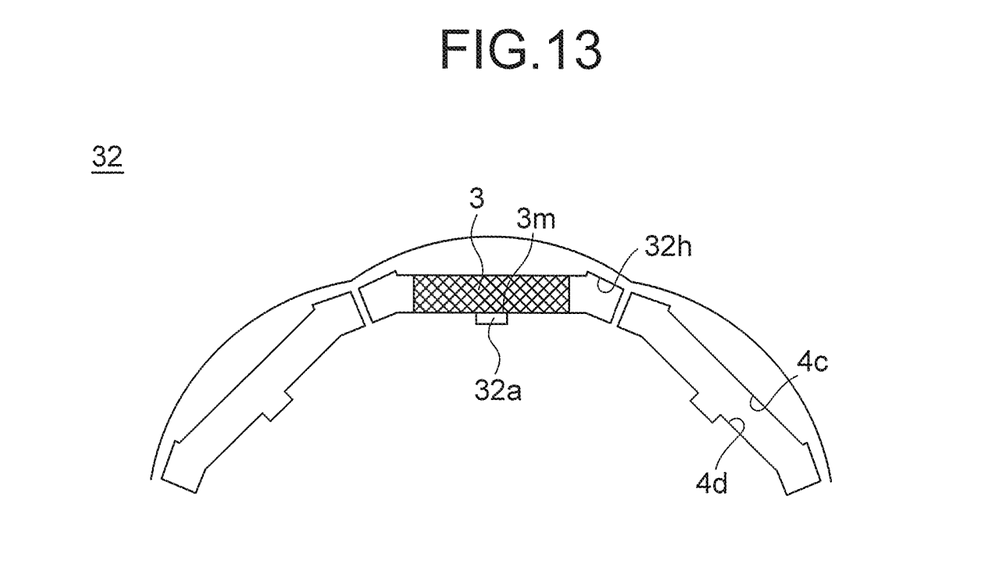
FIG. 13 is a partial plan view for illustrating a second core sheet in the third embodiment.

In FIG. 12 and FIG. 13, there is given an enlarged illustration of only a portion of a core sheet having a substantially circular shape. Further, in FIG. 12 and FIG. 13, a state, in which the magnet 3 is inserted in each hole portion, is illustrated.

FIG. 12 is a partial plan view for illustrating a first core sheet 31. The first core sheet 31 has hole portions 31h in an arc direction. Each hole portion 31h has an outward surface 4c on a radially outer side, and an inward surface 4d on a radially inner side, of the first core sheet 31. A spring plate portion 31a is arranged to a central portion 3m of a long side of the magnet 3 in the inward surface 4d of the hole portion 31h. The spring plate portion 31a has a recess having a rectangular shape from the inward surface 4d of the hole portion 31h toward an outer side of the hole portion 31h, and has a shape in which a rectangular parallelepiped portion protrudes from a central portion of the recess toward an inner side of the hole portion 31h. The spring plate portion 31a is pressed and bent by the magnet 3. The pressed and bent spring plate portion 31a acts to press the magnet 3 by a restoring force against the outward surface 4c of the hole portion 31h.

Further, the hole portion 31h has protruding portions 31b and 31c, which protrude to an outer side of the short sides 3s of the magnets 3 so as to reduce a width of the hole portion 31h. The protruding portions 31b to 31c restrain the movement in the longitudinal direction of the magnets 3 in the hole portion 31h.

FIG. 13 is a partial plan view for illustrating the second core sheet 32. The second core sheet 32 has hole portions 32h in the arc direction. A recessed portion 32a having a rectangular shape is arranged at the central portion 3m of the long side of the magnet 3 in the inward surface 4d of each hole portion 32h. Further, the recessed portion 32a is positioned to correspond to the spring plate portion 31a of the first core sheet 31, and functions as a relief portion of the spring plate portion 31a.

Those two types of core sheets forma pair in which the second core sheet 32 is laminated on the the lower side of one first core sheet 31 to have a thickness equal to or more than a length of the spring plate portion 31a. A plurality of those pairs are arranged. For example, the base core sheet 20 described in FIG. 9 is arranged between those pairs, or at both an upper end and a lower end of the pairs, and the magnets 3 are inserted in the base core sheet 20, to thereby form the IPM rotor.

In this manner, in the IPM rotor 102 in the third embodiment, the protruding portions 31b and 31c are arranged in the hole portions 31h of the first core sheet 31. As a result, the number of types of the core sheets to be prepared can be reduced, and reduction in cost can be achieved.

Thus, it is needless to say that there are a variety of combinations which the core sheet includes the spring plate portion, the recessed portion, and the protruding portion.

Further, consideration is made on a case in which central positions of magnetic poles of magnets are shifted, that is, so-called step-skew. When the step-skew is applied, the following method can be used. First, as described in the first to third embodiments, a plurality of types of core sheets are laminated, and a pair of rotors having magnets inserted therein are formed. Then, similarly, one or more sets of rotors are formed separately. Next, the separately formed rotor is assembled to the previously formed pair of rotors at an upper or a lower of the previously formed pair of rotors. In that case, the separately formed rotor is assembled to be shifted by a predetermined angle around an axis. In this way, step-skew can be achieved. With this method, various IPM rotors can be manufactured without having increased types of core sheets. As a result, a rotor capable of reducing torque ripple can be achieved.

REFERENCE SIGNS LIST 2, 4, 10h, 11h, 12h, 13h, 20h, 21h, 22h, 31h, 32h hole portion, 2d, 4d inward surfaces of hole portion, 3, 3a, 3b magnet, 3e end portions on long sides of magnet, 3m central portion of long side of magnet, 3s short sides of magnet, 10, 20 base core sheet, 11, 21, 31 first core sheet, 11a, 11b, 11c, 11d, 21a, 31a spring plate portion, 11p contact end portion, 12, 22, 32 second core sheet, 12a, 12b, 12c, 12d, 22a, 32a recessed portion, 13 third core sheet, 13a, 13b, 13c, 22b, 22c, 31b, 31c protruding portion, 101, 102 IPM rotor, k length of magnet, m width of spring plate portion, T length of spring plate portion, t thickness of second core sheet, t' thickness of first core sheet.

The invention claimed is:

1. An IPM rotor, which includes a plurality of core sheets each having a hole portion configured to accommodate magnets and being laminated on one another, the magnets being inserted in the hole portions, the IPM rotor comprising:
    a first core sheet of the plurality of laminated core sheets having a spring plate portion provided to an edge of a first hole portion of the first core sheet; and
    a second core sheet of the plurality of laminated core sheets having a recessed portion provided to the edge of a second hole portion of the second core sheet,
    wherein at least one of the plurality of laminated core sheets has a first protruding portion and a second protruding portion provided to the edge of the hole portion of the at least one of the plurality of laminated core sheets, and
    wherein a distance between the first protruding portion and the second protruding portion is greater than a length of a long side of the accommodated magnet.

2. The IPM rotor according to claim 1, wherein the first protruding portion and the second protruding portion are provided to the edge of the first hole portion of the first core sheet.

3. The IPM rotor according to claim 1, wherein the first protruding portion and the second protruding portion are provided to the edge of the second hole portion of the second core sheet.

4. The IPM rotor according to claim 1, further comprising a third core sheet, wherein the first protruding portion and the second protruding portion are arranged in the third core sheet.

5. The IPM rotor according to claim 4, further comprising a base core sheet only having the hole portion,
    wherein the IPM rotor includes portions at which at least the one third core sheet, at least the one base core sheet, the first core sheet, and at least the one second core sheet are laminated in the stated order.

6. The IPM rotor according to claim 1,
    wherein the second core sheet is continuously laminated on the first core sheet,
    wherein the spring plate portion is bent from a contact end portion between the spring plate portion of the first core sheet and the recessed portion of the second core sheet,
    wherein the second core sheet laminated successively has a thickness of equal to or more than a length of the spring plate portion, and
    wherein the length of the spring plate portion is one time or more to ten times or less the thickness of the second core sheet.

7. The IPM rotor according to claim 1, wherein the width of the spring plate portion is one time or more to ten times or less the thickness of the first core sheet.

8. The IPM rotor according to claim 1,
    wherein the magnet has a substantially rectangular parallelepiped shape,
    wherein the hole portion of each of the plurality of laminated core sheets is formed to have a V-shape which is open toward a radially outer side of the core sheet,
    wherein the first protruding portion and the second protruding portion are provided on outer sides of a short side of the magnet, and
    wherein the spring plate portion is provided on the edge of the first hole portion on a radially inner side of the first hole portion, and is provided at an end portion of a long side of the magnet.

9. The IPM rotor according to claim 1,
    wherein the magnet has a substantially rectangular parallelepiped shape,
    wherein the hole portion of each of the plurality of laminated core sheets extends in a circumferential direction of the core sheet,
    wherein the first protruding portion and the second protruding portion are provided on outer sides of a short side of the magnet, and
    wherein the spring plate portion is provided on the edge of the first hole portion on a radially inner side of the first hole portion, and is formed at an center portion of a long side of the magnet.

10. The IPM rotor according to claim 1, wherein the spring plate portion is provided at an end portion of the long side of the magnet in a longitudinal direction of the magnet.

* * * * *